(No Model.) 2 Sheets—Sheet 1.

G. LEVERICH.
CLUTCH FOR CONNECTING AND DISCONNECTING SHAFTS.

No. 431,066. Patented July 1, 1890.

WITNESSES:

INVENTOR
Gabriel Leverich
BY
ATTORNEY.

(No Model.) 2 Sheets—Sheet 2.
G. LEVERICH.
CLUTCH FOR CONNECTING AND DISCONNECTING SHAFTS.
No. 431,066. Patented July 1, 1890.
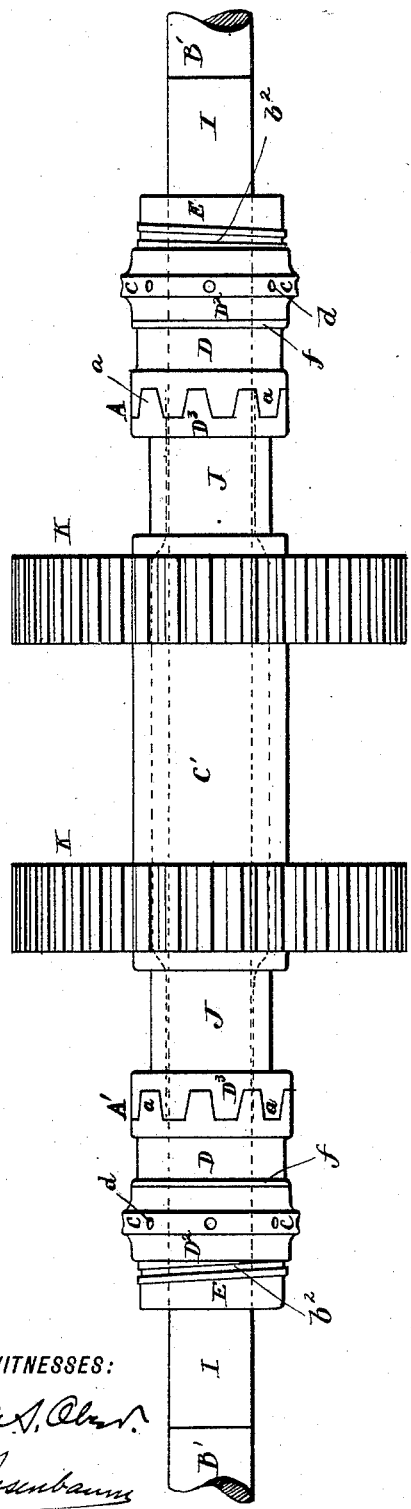
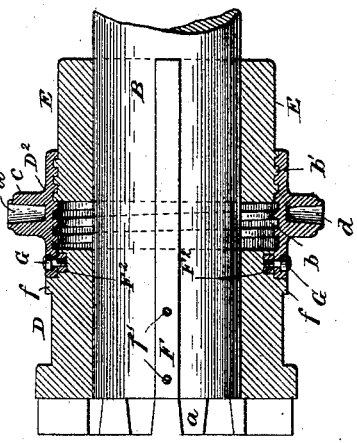
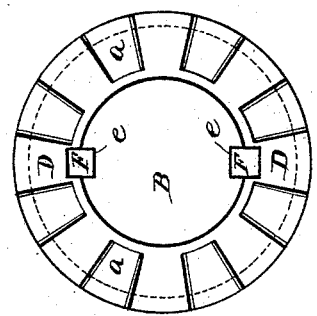
WITNESSES:
Frank S. Ober
Wm A. Rosenbaum
INVENTOR
Gabriel Leverich
BY
W. E. J. Johnston
ATTORNEY.

UNITED STATES PATENT OFFICE.

GABRIEL LEVERICH, OF SOUTH ORANGE, NEW JERSEY.

CLUTCH FOR CONNECTING AND DISCONNECTING SHAFTS.

SPECIFICATION forming part of Letters Patent No. 431,066, dated July 1, 1890.

Application filed January 18, 1890. Serial No. 337,358. (No model.)

*To all whom it may concern:*

Be it known that I, GABRIEL LEVERICH, a citizen of the United States, residing in South Orange, in the county of Essex and State of New Jersey, have invented certain new and useful Improvements in Clutches for Connecting and Disconnecting Shafts, of which the following is a specification.

In mechanism where the power used is applied to a revolving shaft it is sometimes necessary to insert a device whereby a part of the machinery may be connected to or separated from the other and working part. For such purpose ordinarily some form of clutch is employed, that known as a "jaw-clutch" being frequently used. This consists, essentially, of two disks—one on each of the adjoining ends of the driving and driven shaft—one disk being fixed to and the other sliding on a feather along its shaft. On the inner faces of these disks are lugs or jaws, which, when the two shafts are connected, are interlocked by moving the sliding disk inward. For this movement a forked lever at the end of its shorter arm, attached to the disk, is commonly employed. If, however, the power thus transmitted is comparatively large, or sometimes its direction is reversed, the interlocked jaws tend to move apart, causing backlash, side-thrust against the shaft-bearings, and increasing wear of the contact-faces.

The purpose of this invention is to provide a jaw-clutch whereby a rigid connection between two shafts on one line may at will be made and be maintained without backlash or undue wear of the contact-faces, with but little side-thrust on the shaft-bearings when a single clutch is used, and without any when a pair is used.

Accompanying and a part of this specification are the drawings.

Figure 1:
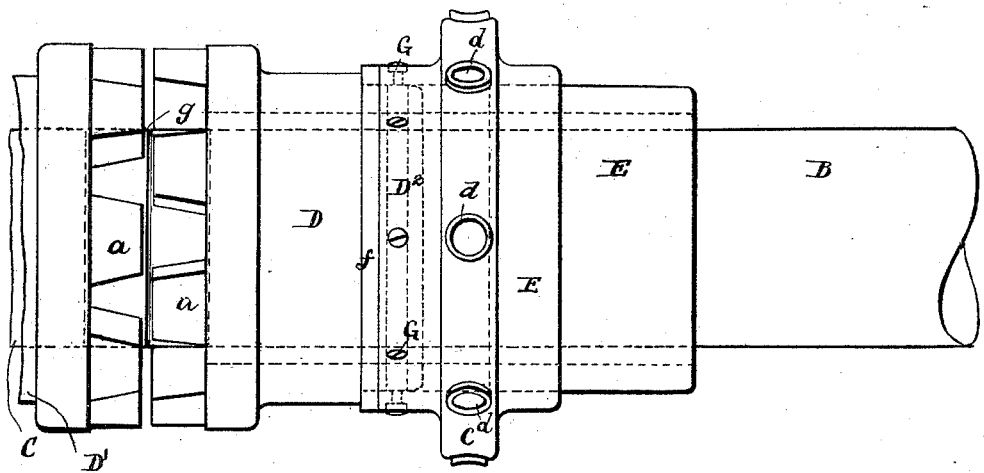
Figure 5:

Figure 1 is an elevation of a single clutch open to connect a divided main shaft. Fig. 2 is an elevation of a pair of clutches closed connecting a main and a hollow shaft. Fig. 3 is a section of the movable and operating parts with a portion of the shaft in elevation. Fig. 4 is an elevation of the jaws, and Fig. 5 is a view of the operating-lever.

Referring to Figs. 1, 3, 4, and 5, a single clutch to connect two shafts on one line or a divided main shaft is described as follows: One part B of the shaft or the driving-shaft is separated from the other part C or the driven shaft at $g$. Firmly keyed on the end of the driven shaft C is the driven sleeve D'. Splined and sliding on the end of the driving-shaft B is the driving-sleeve D, and on the inner adjoining transverse faces of these sleeves are the interlocking jaws or lugs $a$. On the driving-shaft B, at a distance from the driving-sleeve D, in position when the clutch is closed, somewhat greater than the depth of the jaws, is the sleeve E, said sleeve being secured to the shaft by being sweated to it and to the feathers F, which are secured to the shaft by screws $f'$. Fig. 4 shows the location of the two feathers F. On the end of the sleeve E nearest to the driving-sleeve, and projecting from its outer cylindrical surface, are cut the coarse square screw-threads $b'$. Running as a nut on the screw-sleeve E, with similar internal threads $b$, is the capstan-sleeve $D^2$. Usually this sleeve should be in length sufficient to cover and protect the threads on the screw-sleeve when the clutch is closed. At the end opposite to that on which are the jaws the driving-sleeve D is reduced in diameter, leaving a circular shoulder $f$. The annular rabbet thus formed is embraced, as shown in Fig. 3, by the adjoining end of the capstan-sleeve, which, closely in contact with the shoulder, is connected to the driving-sleeve by the circular feather $F^2$, loosely placed in a rectangular groove cut therefor around the cylindrical surface of the rabbet, and made fast to the inner surface of the capstan-sleeve by the tap-screws G. Centrally on and a part of the capstan-sleeve, projecting outwardly, is the capstan-ring $c$, in which are bored radially the taper holes $d$ to receive the operating-lever H, by means of which, to turn the capstan-sleeve, the clutch is closed or opened and the two shafts connected or disconnected. That the driving-sleeve D shall revolve with the driving-shaft B, while free to slide along it, the keys whereby the screw-sleeve E is fixed in position are continued to the end of the shaft, and on the projecting parts or feathers F thus or otherwise secured the grooves $e$ of the driving-sleeve slide.

To provide abundant contact when the clutch is closed between the interlocking jaws, the driving and driven sleeves are enlarged at the inner ends, as shown. For ease in finishing, there should be an odd number of jaws on each sleeve, and for heavy work this, preferably, should be taken so as to make for each jaw the radial length nearly the same as the mean circular width. To permit the clutch to be set up in closing to compensate for wear on the contact-surfaces, the depth should be such that, when closed, those on one sleeve will not bottom between the jaws on the other sleeve. The two contact-surfaces on each jaw are equidistant and slightly inclined from a central radial plane through the axis of the shaft, so that the base is somewhat wider than the top, as shown in Fig. 4.

It will be seen that the pressure necessary to close the clutch and keep it closed is between the driving and capstan sleeves, taken, not on the circular feather, but on the annular shoulders $f$, and thence transmitted through the capstan-sleeve to the screw-sleeve and driving-shaft. This pressure, while the clutch is working, is measured by the inclination of the contact-surfaces of the jaws, which may be small. In some heavy machinery it is desirable to eliminate this pressure from the shaft-bearings. How it may be done by a pair of opposing clutches is shown in Fig. 2. The main or driving shaft B′ is entire and runs on its bearings I I. On this shaft, placed some distance apart and facing each other, are the two clutches A A′, of which the driving, capstan, and screw sleeves and other operating parts are the same as previously described. Filling the space between these parts, surrounding but not in contact with the driving shaft and running on its bearings J J, is the hollow shaft C′, on which are the gears K or their mechanical equivalent, to transmit the power applied to the driving-shaft. Each end $D^3$ of the hollow shaft is enlarged and carries the driving-jaws of the clutch at that end; or, instead, a driven sleeve, as previously described, may be keyed on. For clutches so used in pairs, the screws should be in contrary directions, preferably inclined from each other in the direction the shafts together are to revolve, as shown, so that the clutches may be opened while revolving by inserting the operating-lever in place and holding the capstan-sleeve. It will be noticed that by this arrangement when the clutches are closed and the two shafts are connected the thrust on one clutch is equal and opposed to the thrust on the other, and the two shafts revolve as one without side pressure on their bearings; also, from the relative position of the contact-surfaces in closing the clutches the hollow shaft, whatever within reasonable limits may be the wear and consequent displacement on its bearings, will necessarily be centered on the main shaft.

Having thus described my invention, I claim—

1. A clutch consisting of jaws carried by a driven shaft, in combination with sliding jaws connected with a driving-shaft and a threaded nut carried entirely by and surrounding the driving-shaft and engaging with threads carried thereby, said nut being also connected with the sliding jaws, whereby when the nut is turned the sliding jaw will be moved toward or away from the jaws on the driven shaft, as described.

2. The combination, with the driving-shaft, a fixed threaded sleeve thereon, a capstan-sleeve provided with a thread engaging with the thread on the sleeve, a sliding sleeve on the driving-shaft carrying one-half of a jaw-clutch, and connections between the capstan-sleeve and clutch, consisting of a ring connected with the nut and running loosely in a groove in a sleeve, whereby the sliding sleeve is moved when the capstan-sleeve is turned.

3. The combination, with a main shaft and its bearings, of a hollow shaft or sleeve surrounding the same and having separate bearings, and clutch mechanism located at each end of the hollow shaft or sleeve, whereby the same may be connected to be driven by the shaft, as described.

4. In combination with the two parts of a divided shaft, a clutch consisting of jaws fixed to one part and jaws splined to the other part, a sleeve connected to the splined jaws and with the shaft which carries it, and screw-thread connections between the sleeve and one of its supporting parts, whereby rotation of said sleeve will move the splined jaws toward or from the fixed jaws.

In witness whereof I have hereunto signed my name in the presence of two subscribing witnesses.

GABRIEL LEVERICH.

Witnesses:
 WM. A. ROSENBAUM,
 THOMAS K. TRENCHARD.